Figure 1:
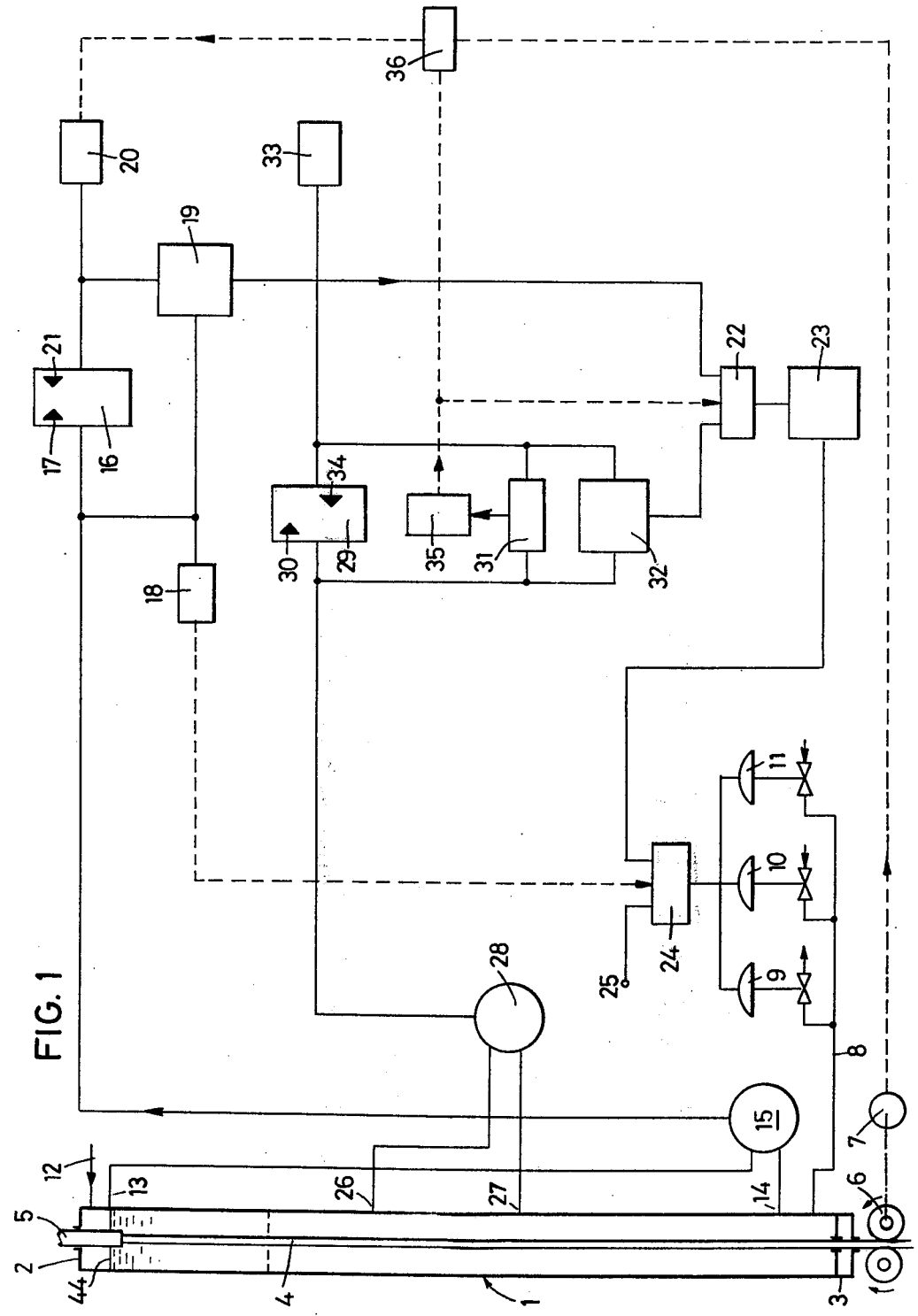

United States Patent [19]

Magnollay

[11] 4,011,102
[45] Mar. 8, 1977

[54] WATER-LEVEL REGULATING DEVICE

[75] Inventor: Gilbert Magnollay, Romanel, Switzerland

[73] Assignee: Maillefer S.A., Switzerland

[22] Filed: Mar. 22, 1976

[21] Appl. No.: 668,921

[52] U.S. Cl. .......................... 134/57 R; 134/122 R; 307/120

[51] Int. Cl.² .......................................... B08B 3/04

[58] Field of Search .......... 307/119, 120; 134/57 R, 134/113, 122 R

[56] References Cited

UNITED STATES PATENTS

| | | | |
|---|---|---|---|
| 3,417,810 | 12/1968 | Tiskus et al. | 134/57 R X |
| 3,760,189 | 9/1973 | Jones, Jr. | 307/120 |
| 3,945,623 | 3/1976 | Gaudilliere et al. | 134/122 R X |

FOREIGN PATENTS OR APPLICATIONS 14,109   4/1956   Germany .......................... 134/122

Primary Examiner—Robert L. Bleutge
Attorney, Agent, or Firm—Stevens, Davis, Miller & Mosher

[57] ABSTRACT

This invention relates to a device for regulating the water level in apparatus for treating an insulated electrical conductor, which device comprises two or more gates actuated by a control signal for filling and emptying the apparatus, a first control circuit having a broad range of adjustment, a second control circuit having a narrow range of adjustment, and an inverter, each circuit in turn comprising a first transmitter for producing a measuring signal, a second transmitter for transmitting a reference signal, and a comparator for producing a control signal and transmitting same to the inverter, the inverter supplying the control signal from the comparator of the first or of the second circuit to the gates.

6 Claims, 3 Drawing Figures

WATER-LEVEL REGULATING DEVICE

Apparatus for treating insulated electrical conductors are known to comprise an inclined enclosure which may exceed 100 m. in length. The insulated conductor passes through this enclosure from one end to the other so that the insulation of the conductor is treated first in the presence of steam, then in water intended to cool it. For large-diameter electrical conductors, e.g., cables which are several centimeters in diameter, the normal rate of advance of the cable, determined by a capstan which pulls the cable at the exit end of the apparatus, is relatively slow. It may, for example, be from one to five meters per minute. Starting up an installation of this kind is a complicated operation. The enclosure is first filled with water almost up to the top. Then the end of the cable, attached to a pulling-wire, is inserted at the top of the enclosure, the upper portion of which, consisting of a telescoping tube, is open. Next the telescoping tube is closed, and the top part of the enclosure is filled with steam while the extruder which applies the insulation to the cable and the capstan which pulls the cable are started up. The level of the water is caused to drop gradually by introducing steam into the top part of the enclosure, the rate of advance of the cable being kept lower than normal most of the time. The regulation of this rate, of the flow of steam, and of the drop in water level must all be co-ordinated and carried out in such a way as to avoid any brusk irregularity in the operation of the installation. When the apparatus stops working, it is advisable to proceed in reverse order, i.e., to cause the water level to rise gradually from its normal position at about the middle of the enclosure up to the top.

Regulating devices of the kind initially described are currently used to control these operations. With these prior art devices, when the apparatus is to be started up, the set-point or reference value emanating from the transmitter of the first control circuit is influenced in such a way that the level controlled by this first circuit sinks gradually from a value corresponding to virtually complete filling of the enclosure down to the value corresponding to normal operating conditions, i.e., a mean value situated between the two measuring points of the second circuit. When the apparatus is to be stopped, the procedure is just the reverse, with the reference level being caused to rise to the top of the enclosure. These devices must be operated when the apparatus is started up and when it is stopped so as to control several parameters at the same time, particularly the speed of the cable, the variation of the reference signal of the first circuit, the amount of steam being fed into the enclosure and, as the case may be, its pressure, with the output of the extruder being monitored all the while. These delicate adjustments are subject to the risks of incorrect operation, necessitating shutdown of the apparatus, which entails the loss of what may be rather substantial lengths of cable and which requires starting up anew.

It is an object of this invention to provide a water-level regulating device which simplifies the starting-up operations of apparatus for treating large-diameter cable while at the same time increasing the reliability of the installation and ensuring the quality of the insulation on the last parts of the cable when the apparatus is stopped.

To this end, the device according to the present invention further comprises means for advancing the insulated conductor, the second transmitter of the first control circuit being connected to this means in such a way that the reference signal transmitted by that second transmitter is automatically a function of the rate of advance of the conductor.

Figure 2:
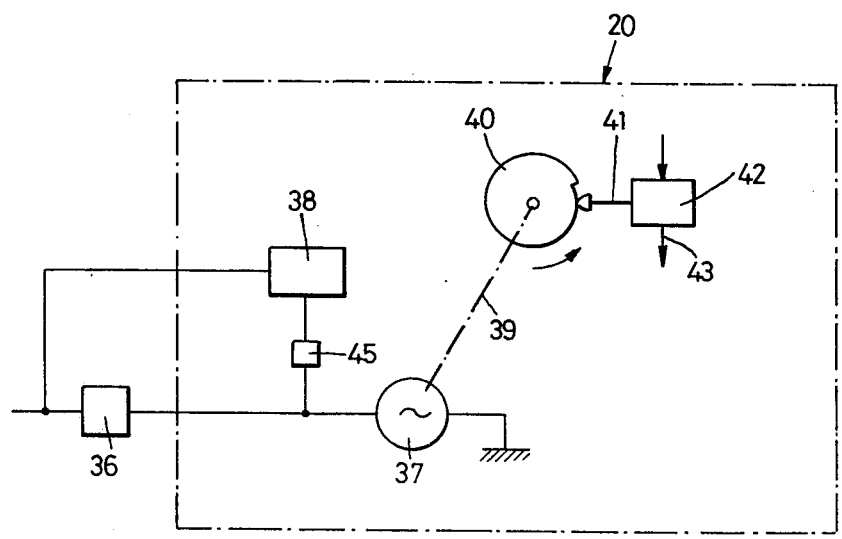
Figure 3:
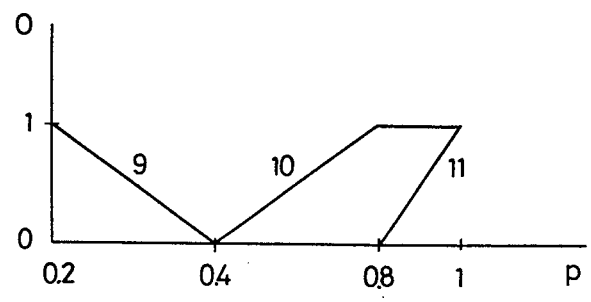

A preferred embodiment of the invention will now be described in detail with reference to the accompanying drawings, in which:

FIG. 1 is an overall diagram of the treatment apparatus and the regulating device, FIG. 2 is a diagram of one of the components of the device shown in FIG. 1, and FIG. 3 is a graph illustrating the operation of the filling and emptying gates of the apparatus.

FIG. 1 shows a diagram of an enclosure 1 of a treatment apparatus comprising a very long tube (which, in reality, would be positioned not vertically but at a slant) provided with sealing means at its top end 2 and its bottom end 3. Passing through the enclosure 1 from one end to the other is a cable 4 coated for part of its length with an insulation 5. At the downstream end of the apparatus, the cable 4 is pulled by a motor-driven capstan 6, the speed of rotation of which is measured by a pulse generator 7. The enclosure 1 is connected at its downstream end to a pipe 8 used for filling the tube with cooling water and for emptying it. A drainage gate 9 enables the enclosure 1 to be emptied, and two filling gates 10 and 11 enable water to be let into the apparatus. The gates 9, 10 and 11 are pneumatically controlled.

Connected to the top of the enclosure 1 is a pipe 12 for introducing steam which is supplied to the pipe 12 from a boiler at variable pressure.

The regulating device proper comprises a first circuit having a broad range of adjustment. This circuit includes measuring points 13 and 14 situated at the top and bottom of the enclosure 1, respectively. The difference in water pressure between the points 13 and 14 is measured by a detector 15 which transmits a measuring signal in the form of pressure. For example, this pressure reaches 1 atm. if the pressure differential between the points 13 and 14 is zero, i.e., if the water level within the tube comes up to the point 13; it reaches 0.2 atm., for example, if the water level is situated at the point 14. The measuring signal of the first circuit is conveyed both to an indicator 16, which indicates the measured level by means of a pointer 17, and to a manostat 18 which constitutes a safety member and keeps the tube from overfilling, as will be seen below. The measuring signal is also conveyed to a comparator 19. The comparator 19 also receives a set-point or reference signal from a transmitter 20 which will be described in detail further on. The signal it produces is transmitted to the indicator 16, a pointer 21 of which indicates the reference value. The pressures transmitted by the measuring member or detector 15 and by the reference-signal transmitter 20 are compared in the comparator 19, and the result of the comparison is sent out in the form of a control signal consisting of pressure in the downstream part of the first control circuit. This control signal may likewise vary between 0.2 atm. and 1 atm. For example, it will be equal to 0.4 atm. if the pressure measured by the detector 15 equals the reference value given by the transmitter 20, but less than 0.4 atm. if the pressure measured at 15 is greater than the reference value and, conversely, greater than 0.4 atm. if the signal transmitted by the detector 15 is less than the reference value. The control signal is conveyed through an inverter 22 consisting of an electrically-operated three-way gate, the function of which will be explained below, through a safety release 23, and through a second electrically-operated gate 24 to the inputs of the three pneumatic gates 3, 10, and 11. It will be noted that the electrically-operated gate 24 is controlled by a signal emanating from the manostat 18. If the pressure in the circuit 15, 18, 19 reaches the maximum value of 1 atm., indicating complete filling of the tube, the manostat 18 switches the three-way gate 24 to a pressure input 25 which, in the example being described, amounts to 0.4 atm. This pressure, acting upon the control signal, then causes the tree gates 9, 10, and 11 to close immediately.

The device being described comprises a second control circuit having a narrow range of adjustment. This second circuit also includes two measuring points: an upper measuring point 26 and a lower measuring point 27. The measuring points 26 and 27 are situated along the enclosure 1 at a short distance from one another in the vicinity of the middle of the enclosure 1. The difference in level between these two points will be 1 m., for example, and they will be placed one on each side of the level which the water should normally reach when the apparatus is in operation. The measurement of the water level in the enclosure 1 starting from the point 27 is carried out in a unit 28, which is a measuring-signal transmitter operating like the transmitting detector 15. The measuring signal transmitted by the unit 28 is indicated by an indicator 29, a pointer 30 of which moves as a function of the pressure prevailing in the circuit 28–29. This pressure also acts upon comparators 31 and 32, which are similar to the comparator 19. The comparators 31 and 32 are furthermore subject to the action of a reference signal from a transmitter 33, a hand-adjustable unit which is continuously set to the value to be reached by the water level under normal operating conditions of the apparatus. The pressure supplied by the transmitter 33 in the form of a reference signal is indicated by means of an index 34 on the indicator 29 and is transmitted to the comparators 31 and 32. As may be seen in the diagram, the comparator 31 transmits a control signal which is supplied to a manostat 35 adapted to control both the inverter 22 and a switch 36 connected into an electric line between the pulse generator 7 and the transmitter 20.

The comparator 32 compares the measuring signal from the unit 28 with the reference signal coming from the transmitter 33 and sends out to the inverter 22 a control signal in the form of a pressure which will likewise amount to 0.4 atm., for example, when the measuring signal transmitted by the unit 28 equals the reference signal from the transmitter 33, but which will be less than that value when the measuring signal indicates that a level greater than the reference value exists between the points 26 and 27, or greater than 0.4 atm. if, on the contrary, the level measured by the unit 28 between the points 26 and 27 is less than the reference level set by the transmitter 33.

Before the variable reference-signal transmitter 20 is described in detail, an explanation will be given of how the gates 9, 10, and 11 react to the control signal which emanates from the inverter 22 and which comes from either the comparator 19 or the comparator 32, according to the position of the inverter 22. FIG. 3 illustrates the degree of opening and closing of each of the gates 9, 10, and 11 as a function of the pressure of the control signal. It will be seen that at a pressure of 0.4 atm., the three gates are closed. The drainage gate 9 opens gradually if the control pressure drops, and it reaches a degree of opening equal to 1 when the pressure of the control signal reaches 0.2 atm. If, on the other hand, the pressure of the control signal increases to beyond 0.4 atm., the gate 10 starts to open and reaches a degree of opening equal to 1 at a pressure of 0.8 atm. The gate 10 is intended to take care of the fine adjustment of the water level by compensating for leakage at the downstream gasket. If the difference between the measured level and the reference value is such that the pressure of the control signal exceeds 0.8 atm., then the gate 11 opens as well in order to increase the intake of water into the apparatus. The gate 11 reaches its maximum degree of opening when the control signal reaches a value of 1 atm.

The reference-signal transmitter 20, as shown in FIG. 2, comprises a motor 37 which is powered by the pulses coming from the pulse generator 7. FIG. 2 also shows the switch 36 inserted in the line connecting the transmitter 7 to the pulse generator 7. The pulses coming from the pulse generator 7 are transmitted to a memory 38 which stores them so as to be able to supply them to the motor 37 again when the apparatus is to be shut off as will be seen below. The motor 37 comprises a rotor, to the shaft 39 of which a cam 40 is fixed. The cam 40 cooperates with a piston 41 which actuates an adjustable relief-valve 42. This pneumatic valve is fed by a constant air pressure and regulates in its outlet pipe 43 a pressure which is variable according to the position of the piston 41 and, consequently, according to the position of the cam 40. The pipe 43 is the one which transmits the reference signal to the indicator 16 and to the comparator 19. The profile of the cam 40 is designed so as to reproduce the variation in the water level as a function of the advance of the cable 4 in the apparatus as it is desired to have it in reality at the moment when the apparatus starts up. For if the movements of the piston 41, as a function of the angle through which the cam 40 has rotated since its initial position, correspond to the successive levels of a given point on the cable 4 as a function of the distance between that point and the top of the apparatus, it suffices for the speed of rotation of the cam 40 to be proportionate to the rate of advance of the cable 4—thus to the speed of rotation of the capstan 6—in order for the reference level set by the transmitter 20 to be identical with the level of that same point on the cable 4 during the whole time the transmitter 20 is in operation, whatever the speed of rotation of the capstan 6 may be. If, for example, that point is the one which marks the beginning of the insulation 5, the transmitter 20 will regulate the water level in the tube in such a way that it constantly reaches to the beginning of the insulation. This agreement between the beginning of the insulation and the level of the water will be maintained even if the speed at which the cable is pulled should be changed, for one reason or another, during the course of the starting-up process.

The mode of operation of the device just described is as follows: the diagram of FIG. 1 represents a situation in which the water level 44 is in the vicinity of the measuring point 13, and the insulation 5 of the cable 4 has also reached that level. The cam 40 is in its starting position, the piston 41 being in contact with the point of its shortest radius, so that the pressure in the circuit 20, 16, 19 equals 1 atm., as indicated by the pointer 21. Upon starting up of the capstan 6 and of the extruder which forms the insulation 5, the cam 40 is driven by the motor 37, and the pressure in the circuit 20, 19 decreases. The pressure of the control signal drops below 0.4 atm., which causes the opening of the drainage gate 9 and, consequently, the sinking of the water level 44. The lowering of the level 44 in the enclosure 1 remains co-ordinated with that of the beginning of the insulation 5 whatever may be the speed at which the cable 4 is pulled. Hence this speed may be governed at will, e.g., as a function of the flow of steam in the pipe 12.

After the water level has reached the point 26, the value of the measuring signal transmitted by the unit 28 is less than 1 atm., and the pointer 30 moves downward towards the pointer 34, which is fixed and indicates the reference value which has been permanently set by means of the transmitter 33. When the pressure of the measuring signal in the circuit 28, 29, 31, 32 reaches the reference pressure set by the transmitter 33, the comparator 31 actuates the manostat 35, which transmits an electrical signal actuating the inverter 22 and the switch 36. The motor 37 stops, and from that moment on it is the comparator 17 which sends its control signal through the inverter 22 and the electrically-operated gate 24 to the gates 9, 10, and 11. Thus the second control circuit goes into action automatically.

The cam 40, which has undergone a rotation on the order of 300°, remains at a standstill during normal operation of the apparatus, and the water level is constantly maintained at the reference value given by the transmitter 33 whatever the rate of advance of the cable 4. It is the comparator 32 which acts to adjust the gate 10 so as to compensate for the leakage which inevitably takes place at the downstream gasket.

If it is now desired to shut off the apparatus, it is important that the length of insulation then situated in the steam zone does not remain in contact with the steam any longer than is necessary for cross-linking to take place, for the insulation must be cooled down after a certain time. To accomplish that, first the capstan 6 is stopped, then the inverter 22 and a switch 45 are operated manually. The memory 38 then controls the motor 37 at a speed of rotation corresponding to the speed at which the cable 4 had been advancing prior to stopping, but in the opposite direction of rotation from the starting-up direction. The cam 40, which is in contact with the piston 41 at one of the points corresponding to the end of its course, rotates and thus causes the piston 41 to move towards the left, as viewed in FIG. 2, so that the pressure in the pipe 43 gradually increases. The reference level controlled by the transmitter 20 increases, and the gates 10 and 11 receive from the comparator 19 the order to open. From then on, the water level rises in the apparatus at a speed corresponding to the rate of advance of the cable 4 prior to stopping, so that successive points of the insulation will be immersed in the cooling water at precisely the same moment they would have been if the apparatus were still running. Thus the last part of the insulation is treated under normal conditions. As soon as the enclosure 1 is full, the manostat 18 detects the maximum pressure admissible for the measuring signal given by the detector 15 and switches the electrically-operated gate 24 to the pressure source 25; this, as has been seen above, causes the three gates 9, 10, and 11 to close.

What is claimed is:

1. A device for regulating the water level in apparatus for treating an insulated electrical conductor, which device comprises two or more gates actuated by a control signal for filling and emptying said apparatus, a first control circuit having a broad range of adjustment, a second control circuit having a narrow range of adjustment, and an inverter, each said circuit in turn comprising a first transmitter for producing a measuring signal, a second transmitter for transmitting a reference signal, and a comparator for producing a control signal and transmitting same to said inverter, said inverter supplying said control signal from said comparator of said first or of said second circuit to said gates, said device further comprising means for advancing said insulated conductor, said second transmitter of said first control circuit being connected to said means in such a way that said reference signal transmitted by said second transmitter of said first control circuit is automatically a function of the rate of advance of said conductor.

2. A device in accordance with claim 1, wherein said second control circuit further comprises control means for automatically controlling said inverter, said measuring signal of said second control circuit being adapted to govern said control means for transmitting to said gates said control signal from said comparator of said second control circuit when said measuring signal of said second control circuit reaches the value of said reference signal of said second control circuit.

3. A device in accordance with claim 1 wherein said control circuits are pneumatic circuits, said second transmitter of said first control circuit comprising a pressure-reducer having a piston, a rotary cam for actuating said piston, and a pulse motor governed by said means for advancing said insulated conductor and adapted to drive said cam rotatingly.

4. A device in accordance with claim 3, wherein said pulse motor is adapted to drive said cam rotatingly through about 300° in a predetermined direction while said conductor is advancing over a distance corresponding to substantially one-half the length of said apparatus.

5. A device in accordance with claim 4, further comprising a memory for permanently storing the rate of advance of said conductor in said apparatus, and a connection between said memory and said pulse motor, said memory being adapted to control said pulse motor via said connection for causing said cam to rotate in the opposite direction from said predetermined direction.

6. A device in accordance with claim 4, wherein said second control circuit further comprises control means for automatically controlling said inverter, said device further comprising a switch controlled by said control means for disconnecting said pulse motor from said means for advancing said conductor at the time of inversion.

* * * * *